United States Patent
Bajaj et al.

(10) Patent No.: US 9,296,085 B2
(45) Date of Patent: Mar. 29, 2016

(54) POLISHING PAD WITH HOMOGENEOUS BODY HAVING DISCRETE PROTRUSIONS THEREON

(71) Applicants: Rajeev Bajaj, Fremont, CA (US); Ping Huang, Eden Prairie, MN (US); Robert Kerprich, Portland, OR (US); William C. Allison, Beaverton, OR (US); Richard Frentzel, Murrieta, CA (US); Diane Scott, Portland, OR (US)

(72) Inventors: Rajeev Bajaj, Fremont, CA (US); Ping Huang, Eden Prairie, MN (US); Robert Kerprich, Portland, OR (US); William C. Allison, Beaverton, OR (US); Richard Frentzel, Murrieta, CA (US); Diane Scott, Portland, OR (US)

(73) Assignee: NexPlanar Corporation, Hillsboro, OR (US)

( * ) Notice: Subject to any disclaimer, the term of this patent is extended or adjusted under 35 U.S.C. 154(b) by 0 days.

(21) Appl. No.: 14/530,534

(22) Filed: Oct. 31, 2014

(65) Prior Publication Data
US 2015/0056900 A1   Feb. 26, 2015

Related U.S. Application Data

(62) Division of application No. 13/113,655, filed on May 23, 2011, now abandoned.

(51) Int. Cl.
*B24B 37/26* (2012.01)
*B24B 37/20* (2012.01)
(Continued)

(52) U.S. Cl.
CPC .............. *B24B 37/26* (2013.01); *B24B 37/205* (2013.01); *B24B 37/22* (2013.01); *B24B 37/24* (2013.01); *B24D 18/0009* (2013.01);
(Continued)

(58) Field of Classification Search
CPC ...... B24B 37/22; B24B 37/24; B24B 37/245; B24B 37/26; B24D 18/00; B24D 18/0009; B29C 39/123; B29K 2075/00; B29K 2009/00; B29L 2031/736
See application file for complete search history.

(56) References Cited

U.S. PATENT DOCUMENTS

| 1,953,983 A | 4/1934 | Benner |
| 5,007,207 A | 4/1991 | Phaal |

(Continued)

FOREIGN PATENT DOCUMENTS

| CN | 2396578 | 8/2007 |
| CN | 101823242 | 9/2010 |

(Continued)

OTHER PUBLICATIONS

International Search Report and Written Opinion from PCT/US2012/038212 mailed Aug. 8, 2012, 20 pgs.

(Continued)

*Primary Examiner* — Lee D Wilson
*Assistant Examiner* — Tyrone V Hall, Jr.
(74) *Attorney, Agent, or Firm* — Thomas Omholt; Arlene Hornilla; Justin Brask (57) ABSTRACT

Polishing pads with homogeneous bodies having discrete protrusions thereon are described. In an example, a polishing pad for polishing a substrate includes a homogeneous body having a polishing side and a back side. The homogeneous body is composed of a material having a first hardness. A plurality of discrete protrusions is disposed on and covalently bonded with the polishing side of the homogeneous body. The plurality of discrete protrusions is composed of a material having a second hardness different from the first hardness. Methods of fabricating polishing pads with homogeneous bodies having discrete protrusions thereon are also described.

16 Claims, 8 Drawing Sheets

(51) Int. Cl.
*B24B 37/22* (2012.01)
*B24B 37/24* (2012.01)
*B24D 18/00* (2006.01)
*B29C 39/12* (2006.01)
*B29K 75/00* (2006.01)
*B29L 9/00* (2006.01)
*B29L 31/00* (2006.01)

(52) U.S. Cl.
CPC .......... *B29C 39/123* (2013.01); *B29K 2075/00* (2013.01); *B29L 2009/00* (2013.01); *B29L 2031/736* (2013.01)

(56) References Cited

U.S. PATENT DOCUMENTS

| | | | | |
|---|---|---|---|---|
| 5,014,468 | A | * | 5/1991 | Ravipati ............ B24D 3/28 51/293 |
| 5,190,568 | A | | 3/1993 | Tselesin |
| 5,212,910 | A | * | 5/1993 | Breivogel ........... B24B 37/26 451/287 |
| 5,391,210 | A | * | 2/1995 | Bilkadi ............. B24D 3/342 51/295 |
| 5,453,106 | A | * | 9/1995 | Roberts ............ B24D 11/001 106/36 |
| 5,609,517 | A | * | 3/1997 | Lofaro .............. B24B 37/22 451/526 |
| 5,709,598 | A | * | 1/1998 | Nishio .............. B24D 3/28 451/526 |
| 5,823,855 | A | * | 10/1998 | Robinson ........... B24B 37/24 451/285 |
| 5,893,796 | A | | 4/1999 | Birang et al. |
| 5,921,855 | A | | 7/1999 | Osterheld et al. |
| 5,958,794 | A | * | 9/1999 | Bruxvoort ........... B24B 7/228 216/88 |
| 6,019,666 | A | | 2/2000 | Roberts et al. |
| 6,089,965 | A | | 7/2000 | Otawa et al. |
| 6,106,382 | A | * | 8/2000 | Sakaguchi .......... B24D 3/06 451/443 |
| 6,179,887 | B1 | | 1/2001 | Barber, Jr. |
| 6,183,346 | B1 | | 2/2001 | Gagliardi |
| 6,194,317 | B1 | * | 2/2001 | Kaisaki ............. B24B 7/228 257/E21.304 |
| 6,217,426 | B1 | * | 4/2001 | Tolles .............. B24B 37/16 451/285 |
| 6,299,508 | B1 | * | 10/2001 | Gagliardi ........... B24D 3/34 451/28 |
| 6,413,153 | B1 | * | 7/2002 | Molar .............. B24B 37/24 451/259 |
| 6,454,634 | B1 | | 9/2002 | James et al. |
| 6,498,101 | B1 | * | 12/2002 | Wang .............. B24B 37/11 216/38 |
| 6,544,306 | B2 | | 4/2003 | Suzuki et al. |
| 6,544,373 | B2 | | 4/2003 | Chen et al. |
| 6,575,825 | B2 | | 6/2003 | Tolles et al. |
| 6,736,709 | B1 | | 5/2004 | James et al. |
| 6,838,169 | B2 | | 1/2005 | Obeng |
| 6,884,156 | B2 | | 4/2005 | Prasad et al. |
| 7,029,747 | B2 | | 4/2006 | Huh et al. |
| 7,169,029 | B2 | | 1/2007 | Petersen et al. |
| 7,198,549 | B2 | | 4/2007 | Steckenrider et al. |
| 7,201,647 | B2 | | 4/2007 | Lombardo et al. |
| 7,235,114 | B1 | | 6/2007 | Minick et al. |
| 7,530,880 | B2 | | 5/2009 | Bajaj et al. |
| 7,846,008 | B2 | | 12/2010 | Bajaj |
| 2003/0207659 | A1 | * | 11/2003 | Annen ............... B24D 3/26 451/526 |
| 2003/0217927 | A1 | * | 11/2003 | Basol ............... B23H 5/08 205/93 |
| 2004/0248508 | A1 | | 12/2004 | Lombardo |
| 2007/0212979 | A1 | * | 9/2007 | Preston ............ B24B 37/205 451/6 |
| 2009/0145045 | A1 | | 6/2009 | Sung |
| 2009/0176443 | A1 | | 7/2009 | Kollodge et al. |
| 2010/0317262 | A1 | * | 12/2010 | Boutaghou ........ B24D 18/0009 451/41 |
| 2012/0302148 | A1 | | 11/2012 | Bajaj et al. |
| 2013/0137350 | A1 | | 5/2013 | Allison et al. |

FOREIGN PATENT DOCUMENTS

| | | |
|---|---|---|
| JP | 2004243428 | 9/2004 |
| JP | 2006140240 | 6/2006 |
| JP | 2006239833 | 9/2006 |
| JP | 3851135 | 11/2006 |
| JP | 2007-044814 | 2/2007 |
| JP | 2007530297 | 11/2007 |
| JP | 2010029996 | 2/2010 |
| JP | 2010528885 | 8/2010 |
| JP | 2011-67946 | 4/2011 |
| KR | 10-2006-0127219 | 12/2006 |
| TW | 541225 | 7/2003 |
| TW | 1298667 | 7/2008 |
| WO | WO-2005/099962 | 10/2005 |
| WO | WO-2007104063 | 3/2007 |
| WO | WO-2008154185 | 12/2008 |

OTHER PUBLICATIONS

International Search Report and Written Opinion from PCT/US2012/038212 mailed Dec. 5, 2013, 7 pgs.
International Search Report and Written Opinion from PCT/US2012/038211 mailed Jun. 12, 2014, 6 pgs.
Non-Final Office Action from U.S. Appl. No. 13/113,655 mailed Apr. 15, 2014, 9 pgs.
Non-Final Office Action from U.S. Appl. No. 13/113,655 mailed Oct. 8, 2013, 7 pgs.
Non-Final Office Action from Japan Patent Application No. 2014-511502, mailed Jul. 17, 2014, 8 pgs.
International Search Report and Written Opinion from PCT/US2012/038211 mailed Aug. 10, 2012, 8 pgs.
Final Office Action from U.S. Appl. No. 13/113,655 mailed Jul. 31, 2014, 12 pgs.
Non-Final Office Action from U.S. Appl. No. 13/306,849 mailed Oct. 1, 2014, 9 pgs.
Bajaj, Rajeev, et al., U.S. Appl. No. 13/113,655, filed May 23, 2011, 48 pgs.
Taiwan Search Report from Taiwan Patent Application No. 101118247 mailed Oct. 15, 2014, 1 pg.
Notification of Grounds for Refusal received in Korean Patent Application No. 102013-7029736 mailed Feb. 27, 2015, 13 pgs.
Extended European Search Report received in European Patent Application No. 14198969.9 mailed Mar. 11, 2015, 5 pgs.
First Office Action for Chinese Patent Application No. 201280024792.5 mailed Jun. 3, 2015, 22 pgs.
Notice of Allowance and Fees for Japan Patent Application No. 2014-511502, mailed Nov. 5, 2014, 3 pgs.
Final Office Action received in Korean Patent Application No. 10-2013-7029736 mailed Sep. 14, 2015, 4 pgs.

* cited by examiner

POLISHING PAD WITH HOMOGENEOUS BODY HAVING DISCRETE PROTRUSIONS THEREON

CROSS-REFERENCE TO RELATED APPLICATIONS

This application is a divisional of U.S. patent application Ser. No. 13/113,655, filed on May 23, 2011, the entire contents of which are hereby incorporated by reference herein.

TECHNICAL FIELD

Embodiments of the present invention are in the field of chemical mechanical polishing (CMP) and, in particular, polishing pads with homogeneous bodies having discrete protrusions thereon.

BACKGROUND

Chemical-mechanical planarization or chemical-mechanical polishing, commonly abbreviated CMP, is a technique used in semiconductor fabrication for planarizing a semiconductor wafer or other substrate.

The process uses an abrasive and corrosive chemical slurry (commonly a colloid) in conjunction with a polishing pad and retaining ring, typically of a greater diameter than the wafer. The polishing pad and wafer are pressed together by a dynamic polishing head and held in place by a plastic retaining ring. The dynamic polishing head is rotated during polishing. This approach aids in removal of material and tends to even out any irregular topography, making the wafer flat or planar. This may be necessary in order to set up the wafer for the formation of additional circuit elements. For example, this might be necessary in order to bring the entire surface within the depth of field of a photolithography system, or to selectively remove material based on its position. Typical depth-of-field requirements are down to Angstrom levels for the latest sub-50 nanometer technology nodes.

The process of material removal is not simply that of abrasive scraping, like sandpaper on wood. The chemicals in the slurry also react with and/or weaken the material to be removed. The abrasive accelerates this weakening process and the polishing pad helps to wipe the reacted materials from the surface. In addition to advances in slurry technology, the polishing pad plays a significant role in increasingly complex CMP operations.

However, additional improvements are needed in the evolution of CMP pad technology.

SUMMARY

Embodiments of the present invention include polishing pads with homogeneous bodies having discrete protrusions thereon.

In an embodiment, a polishing pad for polishing a substrate includes a homogeneous body having a polishing side and a back side. The homogeneous body is composed of a material having a first hardness. A plurality of discrete protrusions is disposed on and covalently bonded with the polishing side of the homogeneous body. The plurality of discrete protrusions is composed of a material having a second hardness different from the first hardness.

In another embodiment, a polishing pad for polishing a substrate includes a homogeneous body having a polishing side and a back side. The homogeneous body is composed of a material having a first hardness. The polishing side includes a plurality of protrusions having a pattern. A plurality of discrete protrusions is disposed on and aligned with the plurality of protrusions of the polishing side of the homogeneous body. The plurality of discrete protrusions is composed of a material having a second hardness different from the first hardness. The plurality of discrete protrusions has the pattern. A fill layer is disposed on the homogeneous body, around the plurality of protrusions of the polishing side of the homogeneous body. The fill layer is composed of the material of the plurality of discrete protrusions.

In another embodiment, a method of fabricating a polishing pad for polishing a substrate includes mixing a first set of polymerizable materials to form a first mixture in the base of a formation mold. The first mixture is at least partially cured to form a molded homogeneous body having a polishing side and a back side. A second set of polymerizable materials is mixed to form a second mixture on the molded homogeneous body. A lid of the formation mold is placed into the second mixture. The lid has disposed thereon a pattern of grooves. With the lid placed in the second mixture, the second mixture is at least partially cured to form a plurality of discrete protrusions disposed on the polishing side of the molded homogeneous body. The plurality of discrete protrusions has a pattern corresponding to the pattern of grooves of the lid.

DETAILED DESCRIPTION

Polishing pads with homogeneous bodies having discrete protrusions thereon are described herein. In the following description, numerous specific details are set forth, such as specific polishing pad compositions and designs, in order to provide a thorough understanding of embodiments of the present invention. It will be apparent to one skilled in the art that embodiments of the present invention may be practiced without these specific details. In other instances, well-known processing techniques, such as details concerning the combination of a slurry with a polishing pad to perform CMP of a semiconductor substrate, are not described in detail in order to not unnecessarily obscure embodiments of the present invention. Furthermore, it is to be understood that the various embodiments shown in the figures are illustrative representations and are not necessarily drawn to scale.

Polishing pads for CMP operations may have trade-offs in performance such as between across-wafer polishing uniformity versus within die polishing uniformity. For example, hard polishing pads may exhibit good die-level planarization, but poor across-wafer uniformity. On the other hand, soft polishing pads may exhibit poor die-level planarization (e.g., they may cause dishing within die), but good wafer-level uniformity. An approach to mitigating the above performance trade-off may be to decouple within-wafer and within-die polishing effects.

In one attempt, a soft subpad has been paired with a hard polishing layer. However, the structures that make of the hard polishing layer, such as tile structures, tend to unfavorably lean over when compressed into the soft subpad during a polishing operation. Furthermore, delamination of the features of the hard polishing layer from the soft subpad can significantly reduce the life of the polishing pad.

In accordance with embodiments of the present invention, approaches to mitigating the above described performance trade-off include the formation of polishing pads having hard discrete protrusions covalently bonded with a soft homogeneous body. Other polishing pads have hard discrete protrusions disposed on a soft homogeneous body having hard lateral supporting, yet discontinuous, features to inhibit toppling of the discrete protrusions during compression into the underlying homogeneous body. It is to be understood that reverse arrangements, e.g., soft polishing protrusions disposed on hard underlying homogeneous bodies are also contemplated herein.

Such multi-layer polishing pads may be fabricated with a molding process to ensure chemical bonding between the protrusions and the underlying homogeneous body. For example, in one embodiment, a multi-layer CMP pads is fabricated in-situ by forming a second pad precursor above a partially cured first pad precursor and further curing both portions together. The first material may be pre-pressed or may not be not-pressed. In either case, the whole pad is pressed and post-cured as an integral polishing pad. By using such an in-situ approach, chemical bonding between layers may be very strong, reducing or eliminating any potential for delamination. In an embodiment, pre-pressing or pressing involves the moving together of upper and lower portions of a molding apparatus.

In an aspect of the present invention, a polishing pad is provided with a substantially flat homogeneous body having discrete protrusions thereon. For example, FIG. 1 illustrates a cross-sectional view of a polishing pad with a homogeneous body having discrete protrusions thereon, in accordance with an embodiment of the present invention.

Figure 1:
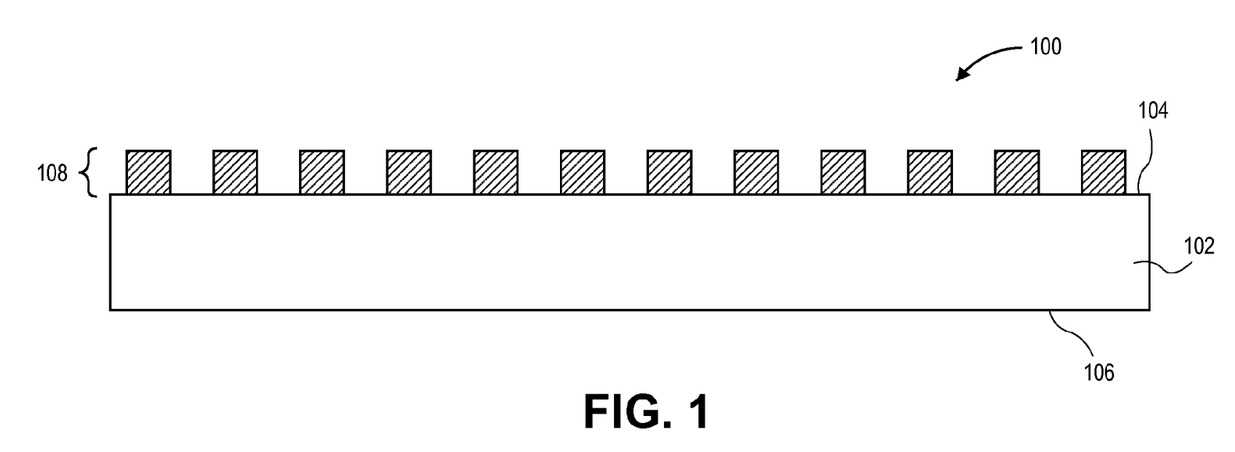
FIG. 1 illustrates a cross-sectional view of a polishing pad with a homogeneous body having discrete protrusions thereon, in accordance with an embodiment of the present invention.

Referring to FIG. 1, a polishing pad 100 is provided for polishing a substrate. The polishing pad 100 includes a homogeneous body 102 having a polishing side 104 and a back side 106. The homogeneous body 102 is composed of a material having a first hardness. The polishing pad 100 also includes a plurality of discrete protrusions 108 disposed on the polishing side 104 of the homogeneous body 102. The plurality of discrete protrusions 108 is composed of a material having a second hardness, different from the first hardness. In an embodiment, the polishing side 104 of the homogeneous body 102 is substantially flat and is exposed between the plurality of discrete protrusions 108, as depicted in FIG. 1. In one such embodiment, each of the plurality of discrete protrusions 108 has, in a global plane of the polishing side 104 of the homogeneous body 102, a shortest dimension approximately in the range of 5-50 millimeters.

In accordance with an embodiment of the present invention, the hardness of the material of the homogeneous body 102 (first hardness) is less than the hardness of the material of the plurality of discrete protrusions 108 (second hardness). In one such embodiment, the first hardness is less than approximately 40 Shore D, and the second hardness is greater than approximately 30 Shore D. In a specific such embodiment, the first hardness is less than approximately 25 Shore D, and the second hardness is greater than approximately 40 Shore D.

In accordance with another embodiment of the present invention, the hardness of the material of the homogeneous body 102 (first hardness) is greater than the hardness of the material of the plurality of discrete protrusions 108 (second hardness). In one such embodiment, the second hardness is less than approximately 40 Shore D, and the first hardness is greater than approximately 30 Shore D. In a specific such embodiment, the second hardness is less than approximately 25 Shore D, and the first hardness is greater than approximately 40 Shore D.

In another aspect of the present invention, a polishing pad is provided with a topographically patterned homogeneous body having discrete protrusions thereon. For example, FIG. 2 illustrates a cross-sectional view of another polishing pad with a homogeneous body having discrete protrusions thereon, in accordance with an embodiment of the present invention.

Figure 2:
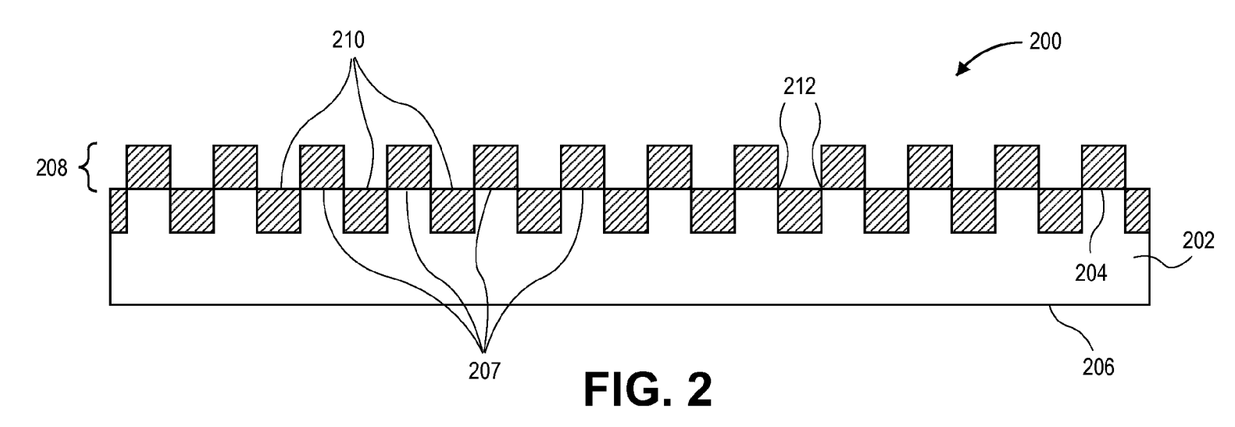
FIG. 2 illustrates a cross-sectional view of another polishing pad with a homogeneous body having discrete protrusions thereon, in accordance with an embodiment of the present invention.

Referring to FIG. 2, a polishing pad 200 is provided for polishing a substrate. The polishing pad 200 includes a homogeneous body 202 having a polishing side 204 and a back side 206. The homogeneous body 202 is composed of a material having a first hardness. The polishing side 204 of the homogeneous body 202 includes a plurality of protrusions 207 having a pattern. The polishing pad 200 also includes a plurality of discrete protrusions 208 disposed on and aligned with the plurality of protrusions 207 of the polishing side 204 of the homogeneous body 202. The plurality of discrete protrusions 208 has the pattern of the plurality of protrusions 207 and is composed of a material having a second hardness, different from the first hardness. Polishing pad 200 also includes a fill layer 210 disposed on the homogeneous body 202, around the plurality of protrusions 207 of the polishing side 204 of the homogeneous body 202. The fill layer is composed the material of the plurality of discrete protrusions 208. In one such embodiment, each of the plurality of protrusions 207 and each of the plurality of discrete protrusions 208 has, in a global plane of the polishing side 204 of the homogeneous body 202, a shortest dimension approximately in the range of 5-50 millimeters.

In an embodiment, the fill layer 210 is discontinuous with the plurality of discrete protrusions 208. That is, referring to FIG. 2, the fill layer is not bonded to or continuous with the plurality of discrete protrusions 208 at locations 212. Such an arrangement may enable freedom of compression of each of the plurality of discrete protrusions 208 into the homogeneous body 208 during a polishing process. Yet, the presence of discontinuous fill layer 210 may guide and support either side of each of the plurality of discrete protrusions 208 as they are compressed into the homogeneous body 208. However, in an alternative embodiment, the fill layer 210 is continuous with the plurality of discrete protrusions 208.

In accordance with an embodiment of the present invention, the hardness of the material of the homogeneous body 202 (first hardness) is less than the hardness of the material of the plurality of discrete protrusions 208 and the fill layer 210 (second hardness). In one such embodiment, the first hardness is less than approximately 40 Shore D, and the second hardness is greater than approximately 30 Shore D. In a specific such embodiment, the first hardness is less than approximately 25 Shore D, and the second hardness is greater than approximately 40 Shore D.

In accordance with another embodiment of the present invention, the hardness of the material of the homogeneous body 208 (first hardness) is greater than the hardness of the material of the plurality of discrete protrusions 208 and the fill layer 210 (second hardness). In one such embodiment, the second hardness is less than approximately 40 Shore D, and the first hardness is greater than approximately 30 Shore D. In a specific such embodiment, the second hardness is less than approximately 25 Shore D, and the first hardness is greater than approximately 40 Shore D.

Portions of differing materials within the polishing pads 100 and 200 may be covalently bonded with one another. For example, referring to FIG. 1, in an embodiment, the plurality of discrete protrusions 108 is disposed on and covalently bonded with the polishing side 104 of the homogeneous body 102. In another example, referring to FIG. 2, in an embodiment, both the fill layer 210 and the plurality of discrete protrusions 208 are covalently bonded with the homogeneous body 202. Specifically, the fill layer 210 is covalently bonded within the pattern of the polishing side 204, while the plurality of discrete protrusions 208 is covalently bonded on top of the pattern of the polishing side 204.

In an embodiment, the term "covalently bonded" refers to arrangements where atoms from a first material (e.g., the material of homogeneous body 102 or 202) are cross-linked or share electrons with atoms from a second material (e.g., the material of the plurality of discrete protrusions 108 or 208) to effect actual chemical bonding. Such covalent bonding is distinguished from electrostatic interactions that may result if a portion of a polishing pad is cut out and replaced with an insert region of s differing material. Covalent bonding is also distinguished from mechanical bonding, such as bonding through screws, nails, glues, or other adhesives. As described in detail below, the covalent bonding may be achieved by co-curing, at least to some extent, a polishing body with a plurality of discrete protrusions, as opposed to through separate formation of the polishing body and the plurality of discrete protrusions.

The materials of polishing pads 100 or 200 may be molded. For example, referring to FIG. 1, in an embodiment, the homogeneous body 102 is a molded homogeneous body, and the plurality of discrete protrusions 108 is a plurality of molded protrusions. In another example, referring to FIG. 2, in an embodiment, the homogeneous body 208 is a molded homogeneous body, the plurality of discrete protrusions 208 is a plurality of molded protrusions, and the fill layer 210 is a molded fill layer.

The term "molded" may be used to indicate that a homogeneous body and/or discrete protrusions thereon are formed in a formation mold, as described in more detail below in association with FIGS. 7A-7G and 8A-8D. In an embodiment, the molded discrete protrusions, upon conditioning and/or polishing, have a polishing surface roughness approximately in the range of 1-5 microns root mean square. In one embodiment, the molded discrete protrusions, upon conditioning and/or polishing, have a polishing surface roughness of approximately 2.35 microns root mean square. In an embodiment, the molded discrete protrusions have a storage modulus at 25 degrees Celsius approximately in the range of 30-500 megaPascals (MPa). In another embodiment, the molded discrete protrusions have a storage modulus at 25 degrees Celsius approximately less than 30 megaPascals (MPa). In an embodiment, as described in association with FIGS. 7A-7G and 8A-8D, a polishing pad is composed of a molded polishing body and molded discrete protrusions thereon.

The polishing pads 100 or 200 may include a homogeneous body composed of a thermoset polyurethane material. In an embodiment, the homogeneous body is composed of a thermoset, closed cell polyurethane material. In an embodiment, the term "homogeneous" is used to indicate that the composition of a thermoset, closed cell polyurethane material is consistent throughout the entire composition of the body. For example, in an embodiment, the term "homogeneous" excludes polishing pad bodies composed of, e.g., impregnated felt or a composition (composite) of multiple layers of differing material.

In an embodiment, the term "thermoset" is used to indicate a polymer material that irreversibly cures, e.g., the precursor to the material changes irreversibly into an infusible, insoluble polymer network by curing. For example, in an embodiment, the term "thermoset" excludes polishing pads composed of, e.g., "thermoplast" materials or "thermoplastics"—those materials composed of a polymer that turns to a liquid when heated and returns to a very glassy state when cooled sufficiently. It is noted that polishing pads made from thermoset materials are typically fabricated from lower molecular weight precursors reacting to form a polymer in a chemical reaction, while pads made from thermoplastic materials are typically fabricated by heating a pre-existing polymer to cause a phase change so that a polishing pad is formed in a physical process. Polyurethane thermoset polymers may be selected for fabricating polishing pads described herein based on their stable thermal and mechanical properties, resistance to the chemical environment, and tendency for wear resistance.

In one embodiment, referring to FIG. 1, the material of the homogeneous body 102 is composed of a first thermoset polyurethane material, and the material of the plurality of discrete protrusions 108 is composed of a second, different, thermoset polyurethane material. In one embodiment, referring to FIG. 2, the material of the homogeneous body 202 is composed of a first thermoset polyurethane material, and the material of the plurality of discrete protrusions 208 and the fill layer 210 is composed of a second, different, thermoset polyurethane material.

In an embodiment, polishing pads described herein, such as polishing pads 100 or 200, include a polishing body and/or discrete protrusions thereon having a plurality of closed cell pores therein. In one embodiment, the plurality of closed cell pores is a plurality of porogens. For example, the term "porogen" may be used to indicate micro- or nano-scale spherical or somewhat spherical particles with "hollow" centers. The hollow centers are not filled with solid material, but may rather include a gaseous or liquid core. In one embodiment, the plurality of closed cell pores is composed of pre-expanded and gas-filled EXPANCEL™ distributed throughout (e.g., as an additional component in) a polishing body and/or discrete protrusions of a polishing pad. In a specific embodiment, the EXPANCEL™ is filled with pentane. In an embodiment, each of the plurality of closed cell pores has a diameter approximately in the range of 10-100 microns. In an embodiment, the plurality of closed cell pores includes pores that are discrete from one another. This is in contrast to open cell pores which may be connected to one another through tunnels, such as the case for the pores in a common sponge. In one embodiment, each of the closed cell pores includes a physical shell, such as a shell of a porogen, as described above. In another embodiment, however, each of the closed cell pores does not include a physical shell. In an embodiment, the plurality of closed cell pores is distributed essentially evenly throughout a thermoset polyurethane material of a homogeneous body or of a homogeneous plurality of discrete protrusions disposed thereon.

In an embodiment, the density or concentration of the plurality of closed cells differs between the homogeneous body (e.g., 102 or 202) and the plurality of discrete protrusions (e.g., 108 or 208). In one such embodiment, the density or concentration of closed cells in the homogeneous body is less than that in the plurality of discrete protrusions. In a specific such embodiment, there are no closed cells in the homogeneous body while there are closed cells in the plurality of discrete protrusions. In an alternative embodiment, the density or concentration of closed cells in the homogeneous body is greater than that in the plurality of discrete protrusions. In another embodiment, the type of closed cells differs between the homogeneous body and the plurality of discrete protrusions.

In an embodiment, polishing pads described herein, such as polishing pads 100 or 200, include a polishing body and/or discrete protrusions that are opaque. In one embodiment, the term "opaque" is used to indicate a material that allows approximately 10% or less visible light to pass. In one embodiment, the polishing body and/or discrete protrusions are opaque in most part, or due entirely to, the inclusion of an opacifying particle filler, such as a lubricant, throughout (e.g., as an additional component in) the polishing body and/or discrete protrusions. In a specific embodiment, the opacifying particle filler is a material such as, but not limited to: boron nitride, cerium fluoride, graphite, graphite fluoride, molybdenum sulfide, niobium sulfide, talc, tantalum sulfide, tungsten disulfide, or Teflon®.

In an embodiment, the degree of opaqueness or the concentration of particle filler differs between the homogeneous body (e.g., 102 or 202) and the plurality of discrete protrusions (e.g., 108 or 208). In one such embodiment, the concentration of particle filler in the homogeneous body is less than that in the plurality of discrete protrusions. In a specific such embodiment, there is no particle filler included in the homogeneous body while particle filler is included in the plurality of discrete protrusions. In an alternative embodiment, the concentration of particle filler in the homogeneous body is greater than that in the plurality of discrete protrusions. In another embodiment, the type of particle filler differs between the homogeneous body and the plurality of discrete protrusions.

Figure 3:
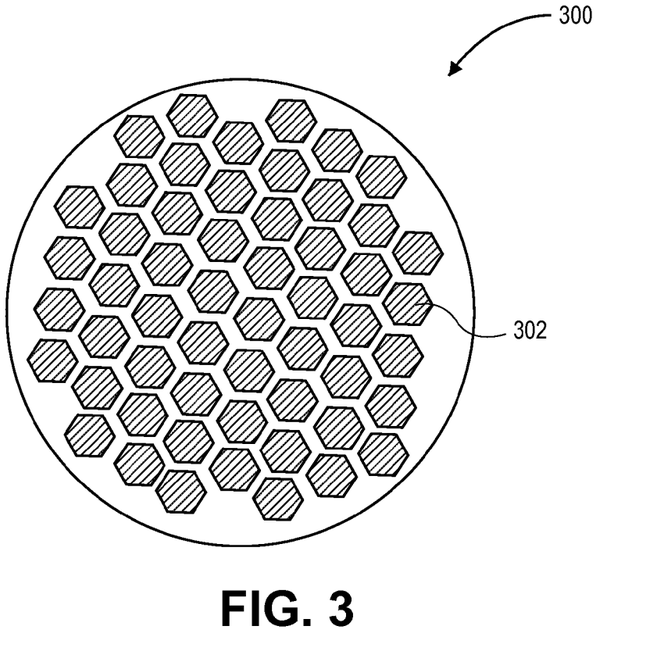
FIG. 3 illustrates a top-down view of a polishing pad with a homogeneous body having discrete hexagonal tile protrusions thereon, in accordance with an embodiment of the present invention.

In an aspect of the present invention, the plurality of discrete protrusions 108 or 208 may have a pattern suitable for polishing during a CMP operation. In a first general example, some embodiments of the present invention include a plurality of discrete protrusions having a pattern of tiles. In a specific such embodiment, FIG. 3 illustrates a top-down view of a polishing pad 300 with a homogeneous body having discrete hexagonal tile protrusions 302 thereon, in accordance with an embodiment of the present invention. Other specific such embodiments include, but are not limited to, pluralities of circular tiles, oval tiles, square tiles, rectangular tiles, or a combination thereof.

Figure 4:
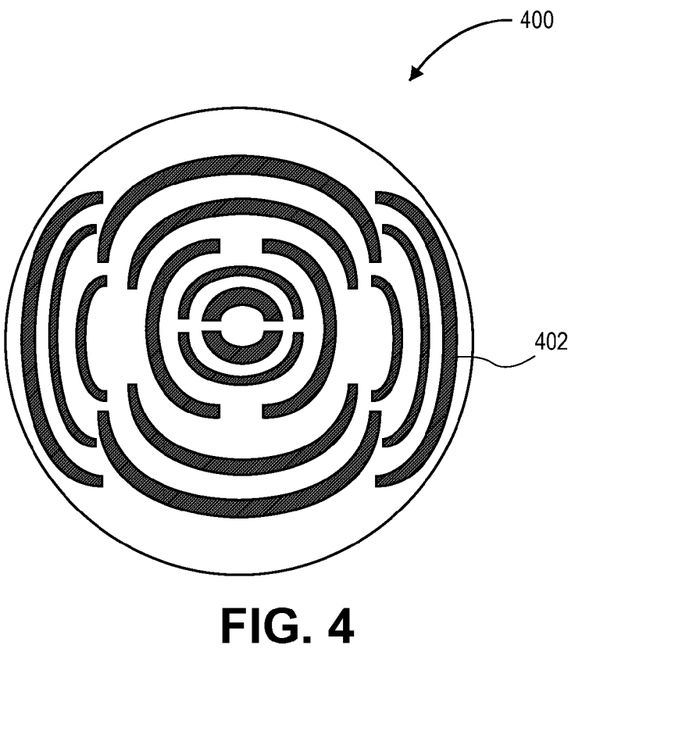
FIG. 4 illustrates a top-down view of a polishing pad with a homogeneous body having discrete arc-shaped protrusions thereon, in accordance with an embodiment of the present invention.

In a second general example, some embodiments of the present invention include a plurality of discrete protrusions having a pattern of curved features. In a specific such example, FIG. 4 illustrates a top-down view of a polishing pad 400 with a homogeneous body having discrete arc-shaped protrusions 402 thereon, in accordance with an embodiment of the present invention. Other specific such embodiments include, but are not limited to, a plurality of partial circumferential protrusions disposed on a substantially circular homogenous body of the polishing pad.

Figure 5:
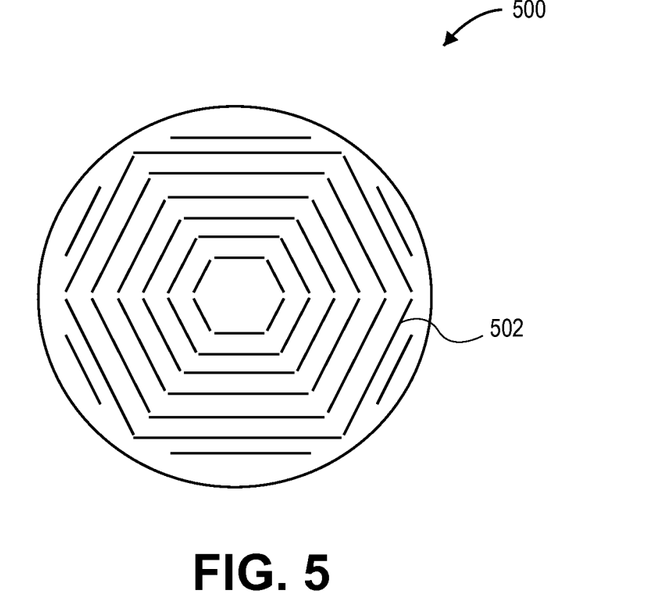
FIG. 5 illustrates a top-down view of a polishing pad with a homogeneous body having discrete linear segment protrusions thereon, in accordance with an embodiment of the present invention.

In a third general example, some embodiments of the present invention include a plurality of discrete protrusions having a pattern of linear features. In a specific such example, FIG. 5 illustrates a top-down view of a polishing pad 500 with a homogeneous body having discrete linear segment protrusions 502 thereon, in accordance with an embodiment of the present invention. The discrete linear segment protrusions shown are essentially orthogonal to radii of the polishing surface. It is to be understood, however, that embodiments of the present invention may also include discrete linear segments that are not precisely orthogonal to radii of the polishing surface. In such embodiments, the discrete linear segments may form a portion of a, but not a complete, concentric or approximately concentric polygon arrangement. The relative association with the corresponding radius in not precisely 90 degrees but rather, perhaps, a fraction of a degree to a few degrees off of 90 degrees. Nonetheless, such near-orthogonal or approximately orthogonal discrete linear segments are considered to be within the spirit and scope of the present invention.

In an embodiment, polishing pads described herein, such as polishing pads 100, 200, 300, 400 or 500, are suitable for polishing substrates. The substrate may be one used in the semiconductor manufacturing industry, such as a silicon substrate having device or other layers disposed thereon. However, the substrate may be one such as, but not limited to, a substrates for MEMS devices, reticles, or solar modules. Thus, reference to "a polishing pad for polishing a substrate," as used herein, is intended to encompass these and related possibilities.

The sizing of the homogeneous body and the discrete protrusions disposed thereon may be varied according to application. Nonetheless, certain parameters may be used to make polishing pads including such a homogeneous body with discrete protrusions disposed thereon compatible with conventional processing equipment or even with conventional chemical mechanical processing operations. For example, in accordance with an embodiment of the present invention, the combination of the homogeneous body and the discrete protrusions disposed thereon has a thickness approximately in the range of 0.075 inches to 0.130 inches, e.g., approximately in the range of 1.9-3.3 millimeters. In one embodiment, the homogeneous body has a diameter approximately in the range of 20 inches to 30.3 inches, e.g., approximately in the range of 50-77 centimeters, and possibly approximately in the range of 10 inches to 42 inches, e.g., approximately in the range of 25-107 centimeters. In one embodiment, the homogeneous body and/or the discrete protrusions disposed thereon have a pore density approximately in the range of 6%-36% total void volume, and possibly approximately in the range of 15%-35% total void volume. In one embodiment, the combination of the homogeneous body and the discrete protrusions disposed thereon has a compressibility of approximately 2.5%. In one embodiment, the homogeneous body has a density approximately in the range of 0.70-1.05 grams per cubic centimeter.

In another aspect of the present invention, a polishing pad with a homogeneous body having discrete protrusions thereon further includes a detection region for use with, e.g., an eddy current detection system. For example, FIG. 6 illustrates a top-down plan view of a polishing pad 600 with a homogeneous body having discrete protrusions thereon and including a local area transparency (LAT) region and/or an indication region, in accordance with an embodiment of the present invention.

Figure 6:
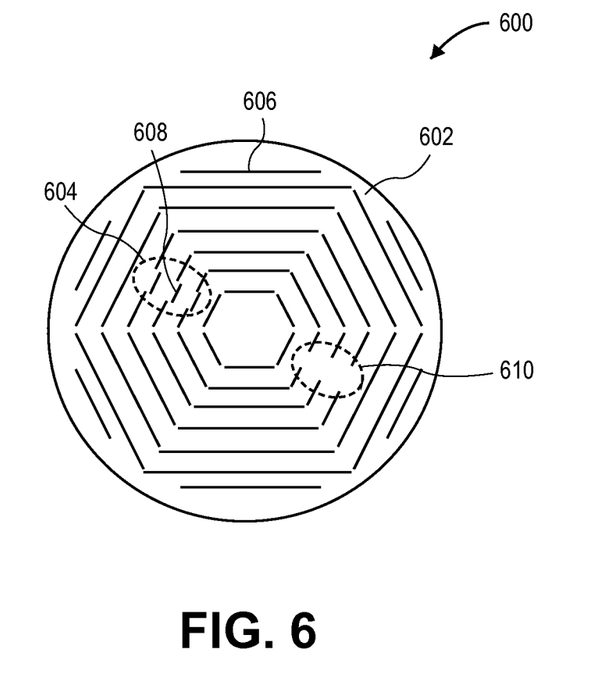
FIG. 6 illustrates a top-down plan view of a polishing pad with a homogeneous body having discrete protrusions thereon and including a local area transparency (LAT) region and/or an indication region, in accordance with an embodiment of the present invention.

Referring to FIG. 6, the polishing surface 602 of polishing pad 600 includes an indication region 604 indicating the location of a detection region disposed in the back surface of the polishing pad 600. In one embodiment, the indication region 604 interrupts a pattern of protrusions 606 with a second pattern of protrusions 608, as depicted in FIG. 6. Examples of suitable detection regions, such as eddy current detection regions, are described in U.S. patent application Ser. No. 12/895,465 filed on Sep. 30, 2010, assigned to NexPlanar Corporation.

In another aspect, a polishing pad with a homogeneous body having discrete protrusions thereon further includes further includes a local area transparency (LAT) region disposed in the polishing pad. For example, referring again to FIG. 6, a LAT region 610 is disposed in the polishing body of polishing pad 600. As depicted in FIG. 6, the LAT region 604 interrupts the pattern of protrusions 606. In an embodiment, the LAT region 610 is disposed in, and covalently bonded with, a homogeneous body of the polishing pad 600. Examples of suitable LAT regions are described in U.S. patent application Ser. No. 12/895,465 filed on Sep. 30, 2010, assigned to NexPlanar Corporation.

In another aspect of the present invention, polishing pads having a homogeneous body with a plurality of discrete protrusions disposed thereon may be fabricated in a molding process. In a first such example, FIGS. 7A-7G illustrate cross-sectional views of operations used in the fabrication of a polishing pad with a homogeneous body having discrete protrusions thereon, in accordance with an embodiment of the present invention.

Figure 7A:
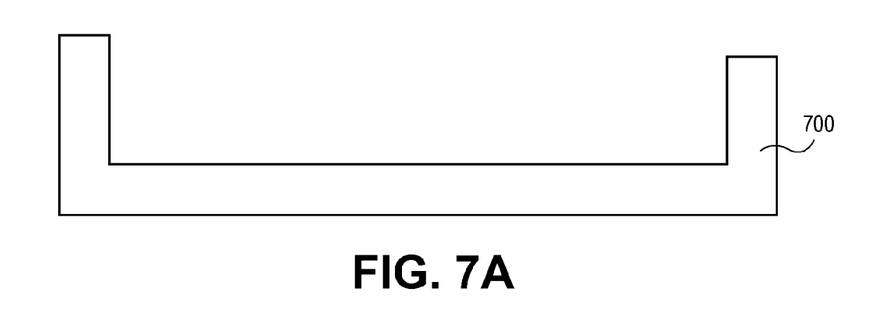
FIGS. 7A-7G illustrate cross-sectional views of operations used in the fabrication of a polishing pad with a homogeneous body having discrete protrusions thereon, in accordance with an embodiment of the present invention.
Figure 7B:
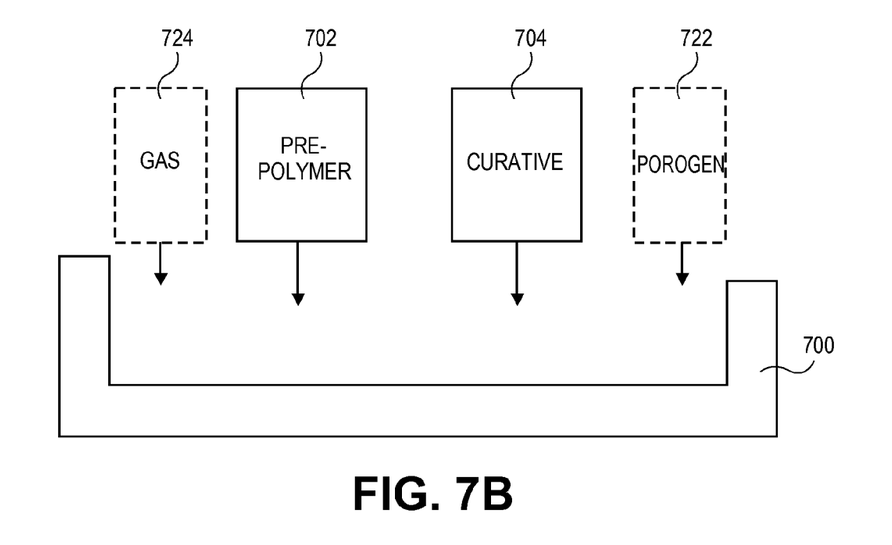
Figure 7C:
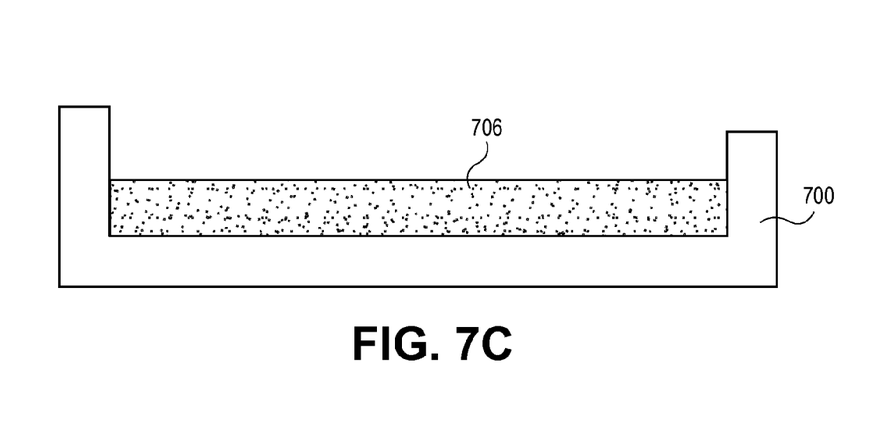

Referring to FIG. 7A, a formation mold 700 is provided. Referring to FIG. 7B, a pre-polymer 702 and a curative 704 are mixed to form a first mixture 706 in the formation mold 700, as depicted in FIG. 7C. In an embodiment, mixing the pre-polymer 702 and the curative 704 includes mixing an isocyanate and an aromatic diamine compound, respectively. In one embodiment, the mixing further includes adding an opacifying particle filler to the pre-polymer 702 and the curative 704 to ultimately provide an opaque molded homogeneous body of a polishing pad. In a specific embodiment, the opacifying particle filler is a material such as, but not limited to: boron nitride, cerium fluoride, graphite, graphite fluoride, molybdenum sulfide, niobium sulfide, talc, tantalum sulfide, tungsten disulfide, or Teflon.

In an embodiment, the first mixture 706 is used to ultimately form a molded homogeneous body composed of a thermoset, closed cell polyurethane material. In one embodiment, the first mixture 706 is used to ultimately form a hard homogeneous body and only a single type of curative is used. In another embodiment, the first mixture 706 is used to ultimately form a soft homogeneous body and a combination of a primary and a secondary curative is used. For example, in a specific embodiment, the pre-polymer includes a polyurethane precursor, the primary curative includes an aromatic diamine compound, and the secondary curative includes a compound having an ether linkage. In a particular embodiment, the polyurethane precursor is an isocyanate, the primary curative is an aromatic diamine, and the secondary curative is a curative such as, but not limited to, polytetramethylene glycol, amino-functionalized glycol, or amino-functionalized polyoxypropylene. In an embodiment, the pre-polymer, a primary curative, and a secondary curative have an approximate molar ratio of 100 parts pre-polymer, 85 parts primary curative, and 15 parts secondary curative. It is to be understood that variations of the ratio may be used to provide a homogeneous body with varying hardness values, or based on the specific nature of the pre-polymer and the first and second curatives.

Figure 7D:
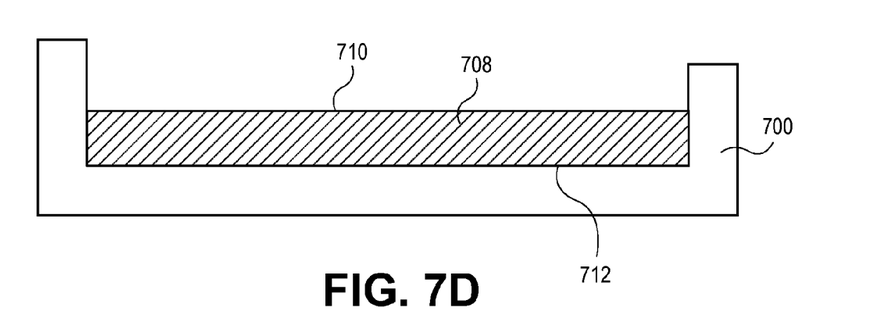
Figure 7E:
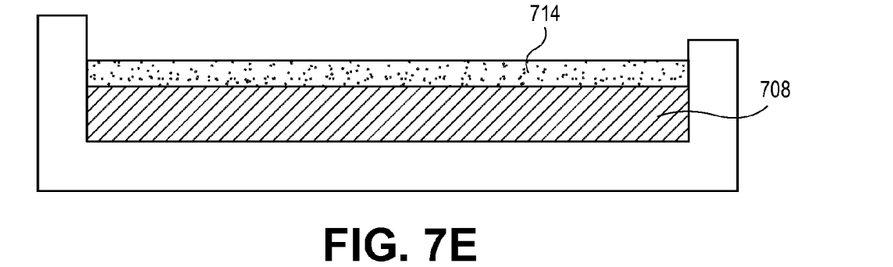

Referring to FIG. 7D, the mixture 706 is at least partially cured to form a molded homogeneous body 708 having a polishing side 710 and a back side 712. The partial curing may be performed by heating the mold 700 in the presence or absence of a formation mold lid. A second pre-polymer and a second curative are then mixed to form a second mixture 714 on the molded homogeneous body 708, as depicted in FIG. 7E. In an embodiment, the second mixture 714 is for forming a hard material, and a pre-polymer along with a single curative is used (2-tank process), while the first mixture 706 is for forming a soft material, and a pre-polymer along with a primary curative and a secondary curative is used (3-tank process). In an alternative embodiment, the first mixture 706 is for forming a hard material, and a pre-polymer along with a single curative is used (2-tank process), while the second mixture 714 is for forming a soft material, and a pre-polymer along with a primary curative and a secondary curative is used (3-tank process). Thus, in an embodiment, the second mixture 714 is different from the first mixture 706. However, in an alternative embodiment, the two mixtures are the same. Also, in an embodiment, the second mixture is dispensed on a partially or completely cured first mixture 706. However, in an alternative embodiment, the pouring or dispensing of the second mixture 714 may be poured in situ into the first mixture 706 to be applied for the same layer, but in a different region. In a specific such embodiment, the center ring and outer ring have different formulations. In an embodiment where two distinct layers are formed, in order to strengthen the chemical bonding between layers, the ratio of functional group within different layers is different, e.g., one layer is —NCO rich and the other layer is —NH$_2$ and/or —OH rich. In an embodiment, a coating is applied between different layers. In an embodiment, penetration occurs between layers and strengthens the chemical bonding, such as the covalent bonding.

In an embodiment, the mixing of the second pre-polymer and the second curative further includes adding an opacifying particle filler to the second pre-polymer and the second curative to form an opaque plurality of discrete protrusions 718. In an embodiment, mixing the first pre-polymer and the first curative to form the first mixture 706 includes degassing the first mixture 706, and mixing the second pre-polymer and the second curative to form the second mixture 714 includes degassing the second mixture 714.

Figure 7F:
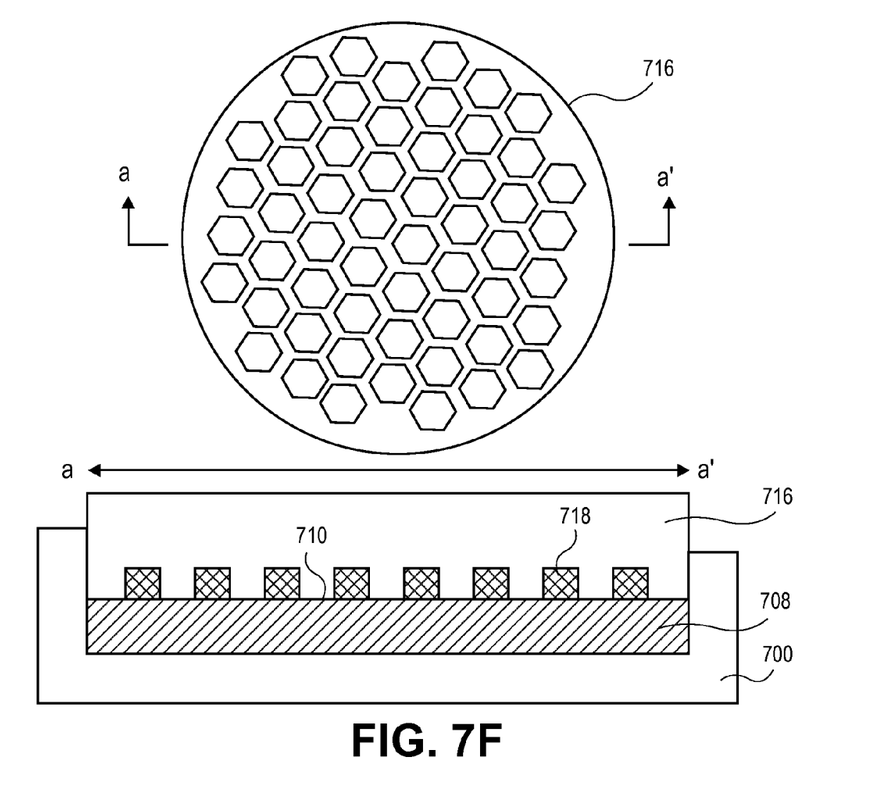

Referring to FIG. 7F, a lid 716 of the formation mold 700 is placed into the second mixture 714. A top-down plan view of lid 716 is shown on top, while a cross-section along the a-a' axis is shown below in FIG. 7F. The lid 716 has disposed thereon a pattern of grooves, such as a pattern of grooves corresponding to the pattern of protrusions described in association with FIG. 3, as depicted in FIG. 7F. Alternatively, however, lid 716 has disposed thereon a pattern of grooves corresponding to the patterns of protrusions described in association with FIGS. 4 and 5.

It is to be understood that embodiments described herein that describe lowering the lid 716 of a formation mold 700 need only achieve a bringing together of the lid 716 and a base of the formation mold 700. That is, in some embodiments, a base of a formation mold 700 is raised toward a lid 716 of a formation mold, while in other embodiments a lid 716 of a formation mold 700 is lowered toward a base of the formation mold 700 at the same time as the base is raised toward the lid 716.

With the lid 716 placed in the second mixture 714, the second mixture 714 is at least partially cured to form a plurality of discrete protrusions 718 disposed on the polishing side 710 of the molded homogeneous body 708. The pattern of grooves of the lid 716 is used to stamp a pattern of protrusions from the second mixture 714 in the formation mold 700. The second mixture 714 may be heated under pressure (e.g., with the lid 716 in place) to provide the molded discrete protrusions 718. In an embodiment, heating in the formation mold 700 includes at least partially curing in the presence of lid 716, which encloses the second mixture 714 in formation mold 700, at a temperature approximately in the range of 200-260 degrees Fahrenheit and a pressure approximately in the range of 2-12 pounds per square inch.

In an embodiment, the second mixture 714 is different from the first mixture 706, and, upon fully curing the first 706 and second 714 mixtures, the hardness of the plurality of discrete protrusions 718 is different from the hardness of the molded homogeneous body 708. In an embodiment, at least partially curing the second mixture 714 includes covalently boding the plurality of discrete protrusions 718 with the molded homogeneous body 708. In an embodiment, forming the molded homogeneous body 708 includes forming a first thermoset polyurethane material, and forming the plurality of discrete protrusions 718 includes forming a second, different, thermoset polyurethane material.

Figure 7G:
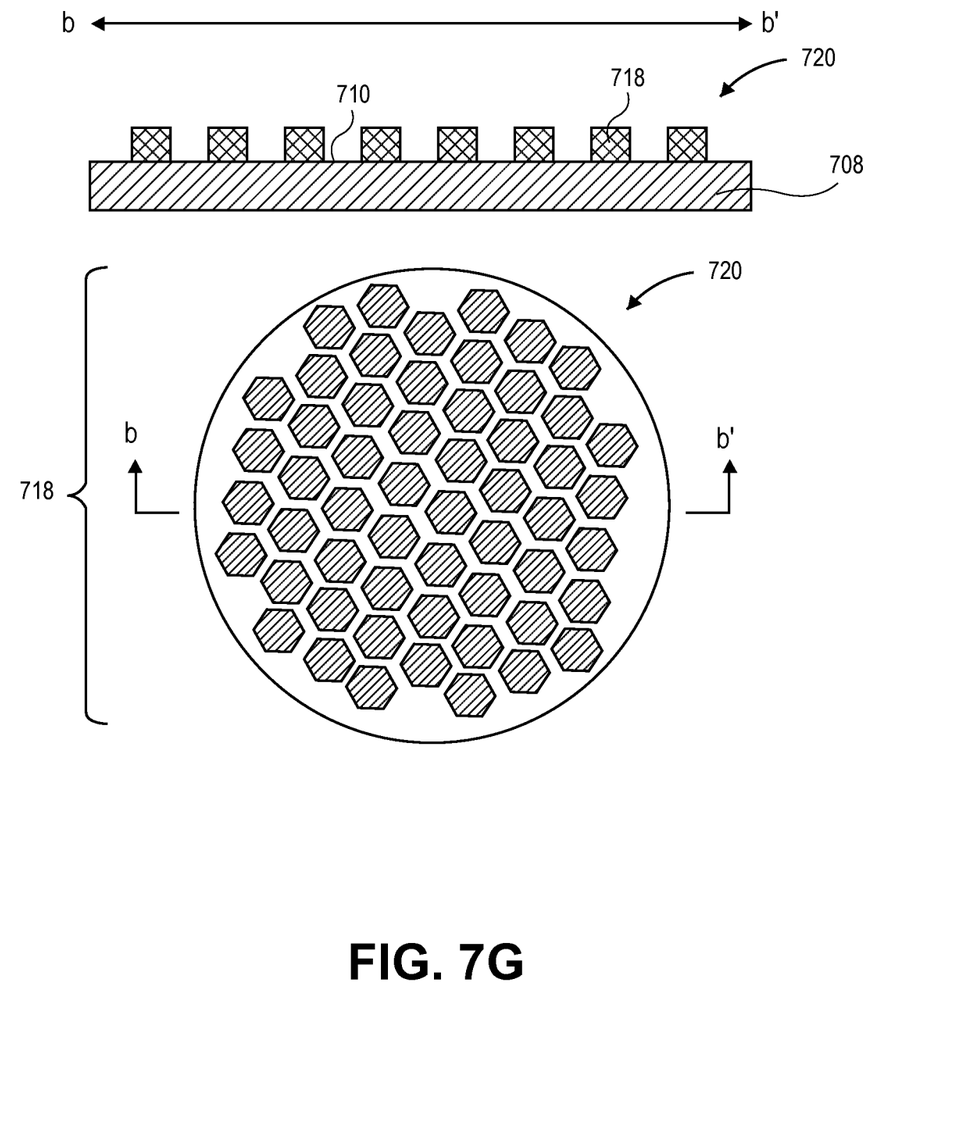

Referring to FIG. 7G, a polishing pad 720 is provided upon removal of the molded homogeneous body 708 with the plurality of discrete protrusions 718 disposed thereon from the formation mold 700. The plurality of discrete protrusions 718 has a pattern corresponding to the pattern of grooves of the lid 716. A top-down plan view of the polishing pad 720 is shown below, while a cross-section taken along the b-b' axis is shown above in FIG. 7G. In an embodiment, the polishing side 710 of the molded homogeneous body 708 is substantially flat and is exposed between the plurality of discrete protrusions 718, as depicted in the cross-sectional view of FIG. 7G.

It is noted that further curing through heating may be desirable and may be performed by placing the polishing pad 720 in an oven and heating. Thus, in one embodiment, curing the first and second mixtures 706 and 714 includes first partially curing in the formation mold 700 and then further curing in an oven. Either way, a polishing pad 720 is ultimately provided, wherein a molded homogeneous body 708 of the polishing pad 720 has a polishing side 710 with a plurality of molded protrusions 718 disposed thereon. In an embodiment, both the molded homogeneous body 708 and the plurality of molded protrusions 718 are composed of thermoset polyurethane materials and a plurality of closed cell pores disposed in the thermoset polyurethane materials.

A similar method to the one described in association with FIG. 7A-7G may be used to fabricate a polishing pad with a topographically patterned homogeneous body having discrete protrusions thereon. For example, FIGS. 8A-8D illustrate cross-sectional views of operations used in the fabrication of another polishing pad with a homogeneous body having discrete protrusions thereon, in accordance with an embodiment of the present invention.

Figure 8A:
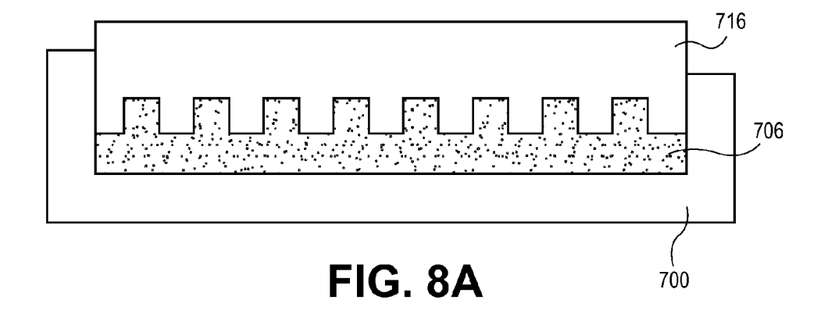
FIGS. 8A-8D illustrate cross-sectional views of operations used in the fabrication of another polishing pad with a homogeneous body having discrete protrusions thereon, in accordance with an embodiment of the present invention.
Figure 8B:
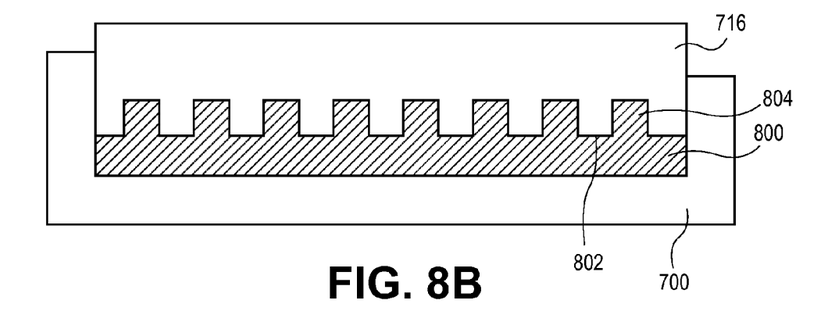

Referring again to FIG. 7C, and now to FIG. 8A, instead of at least partially curing the first mixture 706 to provide a substantially flat surface for a homogeneous body 708, the lid 716 (described in association with FIG. 7F) is used to first form molded homogeneous body 800 with a polishing side 802 having a plurality of protrusions 804 with a pattern corresponding to the pattern of grooves of the lid 716. For example, subsequent to mixing the first pre-polymer and the first curative to form the first mixture 706 but prior to mixing the second pre-polymer and the second curative to form the second mixture 714, the lid 716 of the formation mold 700 is placed into the first mixture 706. With the lid placed in the first mixture 706, the first mixture 706 is at least partially cured, as depicted in FIG. 8B.

Figure 8C:
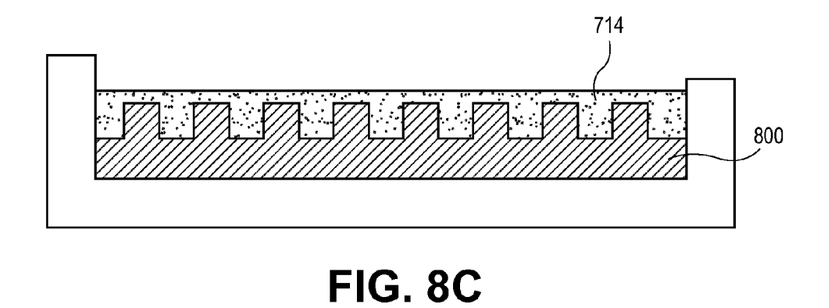
Figure 8D:
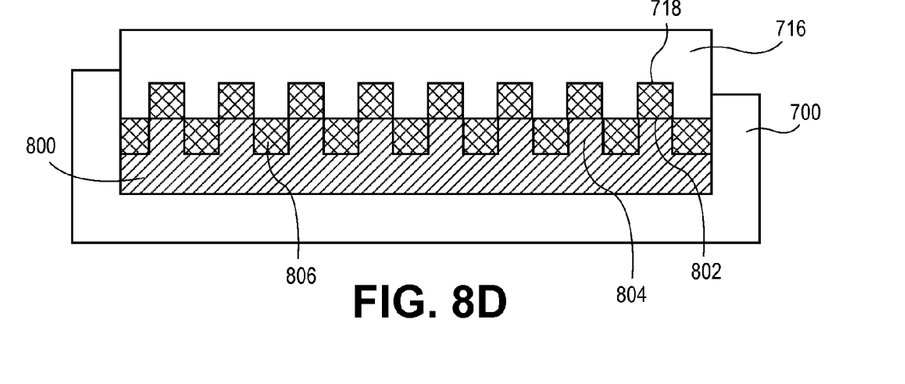

Referring to FIG. 8C, the second pre-polymer and the second curative are then mixed to form the second mixture 714 on the molded homogeneous body 800. The lid 716 of the formation mold 700 is then placed into the second mixture 714, as depicted in FIG. 8D. With the lid 716 placed in the second mixture 714, the second mixture 714 is at least partially cured to form a plurality of discrete protrusions 718 disposed on and aligned with the plurality of protrusions 804 of the polishing side 802 of the molded homogeneous body 800. The pattern of grooves of the lid 716 is used to stamp a pattern of protrusions from the second mixture 714 in the formation mold 700. The second mixture 714 may then be heated under pressure (e.g., with the lid 716 in place) to provide the molded discrete protrusions 718. In an embodiment, heating in the formation mold 700 includes at least partially curing in the presence of lid 716, which encloses the second mixture 714 in formation mold 700, at a temperature approximately in the range of 200-260 degrees Fahrenheit and a pressure approximately in the range of 2-12 pounds per square inch. A polishing pad such as the polishing pad 200 described in association with FIG. 2 may thus be formed.

Referring again to FIG. 8D, in an embodiment, forming the second mixture 714 on the molded homogeneous body 800 includes forming an amount of the second mixture 714 sufficiently large to form a fill layer 806 disposed on the molded homogeneous body 800, around the plurality of protrusions 804 of the polishing side 802 of the molded homogeneous body 800. In one such embodiment, the amount of the second mixture 714 is sufficiently small to form the fill layer 806 discontinuous with the plurality of discrete protrusions 718 formed from the second mixture 714. An example of such discontinuity is described above in association with polishing pad 200 of FIG. 2. In an embodiment, a spin plate is used to control the amount and thickness of the second mixture 714 dispensed on the polishing side 802 of the molded homogeneous body 800.

In an embodiment, the plurality of discrete protrusions 718 is formed on and aligned with the plurality of protrusions 804 of the polishing side 802 of the molded homogeneous body 800. The alignment may tolerate some slight misalignment. For example, a slippage approximately in the range of up to $1/1000^{th}$ on an inch may be acceptable between separate introduction of the lid 716 into the first mixture 706 and the second mixture 714, respectively.

In an embodiment, referring again to FIG. 7B, the mixing further includes adding a plurality of porogens 722 to the pre-polymer 702 and the curative 704 to provide closed cell pores in the ultimately formed body of the polishing pad. Thus, in one embodiment, each closed cell pore has a physical shell. In another embodiment, referring again to FIG. 7B, the mixing further includes injecting a gas 724 into to the pre-polymer 702 and the curative 704, or into a product formed there from, to provide closed cell pores in the ultimately formed body of the polishing pad. Thus, in one embodiment, each closed cell pore has no physical shell. In a combination embodiment, the mixing further includes adding a plurality of porogens 722 to the pre-polymer 702 and the curative 704 to provide a first portion of closed cell pores each having a physical shell, and further injecting a gas 724 into the pre-polymer 702 and the curative 704, or into a product formed there from, to provide a second portion of closed cell pores each having no physical shell. In yet another embodiment, the pre-polymer 702 is an isocyanate and the mixing further includes adding water (H$_2$O) to the pre-polymer 702 and the curative 704 to provide closed cell pores each having no physical shell. In an embodiment, referring to FIGS. 7E and 8C, a plurality of porogens may similarly be included in a molded discrete plurality of protrusions 718.

Thus, protrusion patterns contemplated in embodiments of the present invention may be formed in-situ. For example, as described above, a compression-molding process may be used to form polishing pads with a molded homogeneous body having molded discrete protrusions disposed thereon. By using a molding process, highly uniform protrusion dimensions within-pad may be achieved. Furthermore, extremely reproducible protrusion dimensions along with very smooth, clean protrusion surfaces may be produced. Other advantages may include reduced defects and microscratches and a greater usable protrusion depth.

Polishing pads described herein may be suitable for use with a variety of chemical mechanical polishing apparatuses. As an example, FIG. 9 illustrates an isometric side-on view of a polishing apparatus compatible with a polishing pad with a homogeneous body having discrete protrusions thereon, in accordance with an embodiment of the present invention.

Figure 9:
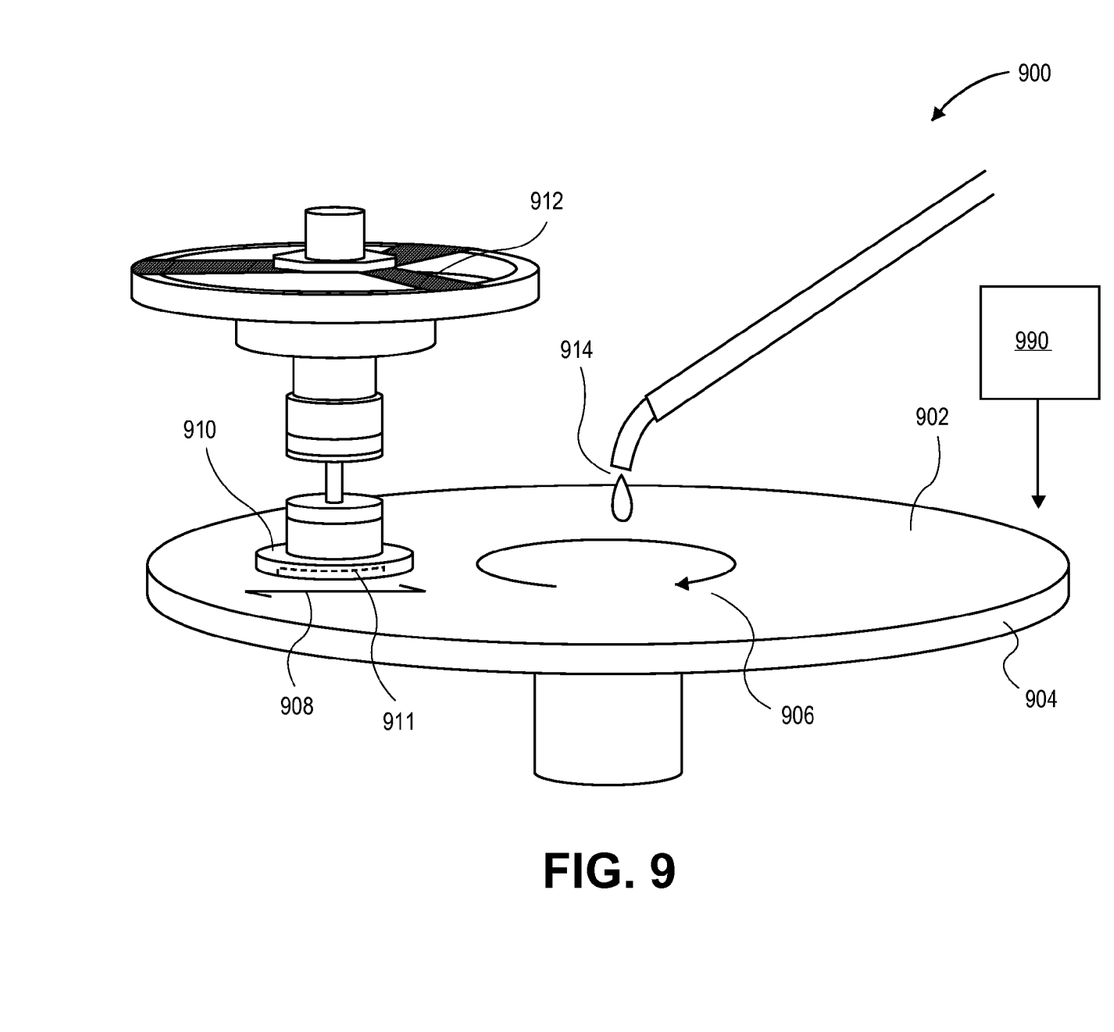
FIG. 9 illustrates an isometric side-on view of a polishing apparatus compatible with a polishing pad with a homogeneous body having discrete protrusions thereon, in accordance with an embodiment of the present invention.

Referring to FIG. 9, a polishing apparatus 900 includes a platen 904. The top surface 902 of platen 904 may be used to support a polishing pad with a homogeneous body having discrete protrusions thereon. Platen 904 may be configured to provide spindle rotation 906 and slider oscillation 908. A sample carrier 910 is used to hold, e.g., a semiconductor wafer 911 in place during polishing of the semiconductor wafer with a polishing pad. Sample carrier 910 is further supported by a suspension mechanism 912. A slurry feed 914 is included for providing slurry to a surface of a polishing pad prior to and during polishing of the semiconductor wafer. A conditioning unit 990 may also be included and, in one embodiment, includes a diamond tip for conditioning a polishing pad.

Thus, polishing pads with homogeneous bodies having discrete protrusions thereon have been disclosed. In accordance with an embodiment of the present invention, a polishing pad for polishing a substrate includes a homogeneous body having a polishing side and a back side. The homogeneous body is composed of a material having a first hardness. A plurality of discrete protrusions is disposed on and covalently bonded with the polishing side of the homogeneous body. The plurality of discrete protrusions is composed of a material having a second hardness different from the first hardness. In one embodiment, the polishing side of the homogeneous body is substantially flat and is exposed between the plurality of discrete protrusions. In one embodiment, a fill layer is disposed on the homogeneous body, around a plurality of protrusions of the polishing side of the homogeneous body, the fill layer composed of the material of the plurality of discrete protrusions. In one embodiment, the homogeneous body is a molded homogeneous body, and the plurality of discrete protrusions is a plurality of molded protrusions.

What is claimed is:

1. A polishing pad for polishing a substrate, the polishing pad comprising:
    a homogeneous body having a polishing side and a back side, the homogeneous body comprising a material having a first hardness, and the polishing side comprising a plurality of protrusions having a pattern;
    a plurality of discrete protrusions disposed on and aligned with the plurality of protrusions of the polishing side of the homogeneous body, the plurality of discrete protrusions comprising a material having a second hardness different from the first hardness, and the plurality of discrete protrusions having the pattern; and
    a fill layer disposed on the homogeneous body, around the plurality of protrusions of the polishing side of the homogeneous body, the fill layer comprising the material of the plurality of discrete protrusions.

2. The polishing pad of claim 1, wherein the fill layer is discontinuous with the plurality of discrete protrusions.

3. The polishing pad of claim 1, wherein both the fill layer and the plurality of discrete protrusions are covalently bonded with the homogeneous body.

4. The polishing pad of claim 1, wherein the homogeneous body is a molded homogeneous body, wherein the plurality of discrete protrusions is a plurality of molded protrusions, and wherein the fill layer is a molded fill layer.

5. The polishing pad of claim 1, wherein the material of the homogeneous body comprises a first thermoset polyurethane material, and the material of the plurality of discrete protrusions and the fill layer comprises a second, different, thermoset polyurethane material.

6. The polishing pad of claim 1, wherein the first hardness of the material of the homogeneous body is less than the second hardness of the material of the plurality of discrete protrusions and the fill layer.

7. The polishing pad of claim 6, wherein the first hardness is less than approximately 40 Shore D, and the second hardness is greater than approximately 30 Shore D.

8. The polishing pad of claim 7, wherein the first hardness is less than approximately 25 Shore D, and the second hardness is greater than approximately 40 Shore D.

9. The polishing pad of claim 1, wherein the first hardness of the material of the homogeneous body is greater than the second hardness of the material of the plurality of discrete protrusions and the fill layer.

10. The polishing pad of claim 9, wherein the second hardness is less than approximately 40 Shore D, and the first hardness is greater than approximately 30 Shore D.

11. The polishing pad of claim 10, wherein the second hardness is less than approximately 25 Shore D, and the first hardness is greater than approximately 40 Shore D.

12. The polishing pad of claim 1, wherein the homogeneous body is substantially circular, and one or more of the plurality of discrete protrusions is a partial circumferential protrusion or an arc-shaped protrusion.

13. The polishing pad of claim 1, wherein the plurality of discrete protrusions comprises a plurality of tiles selected from the group consisting of circular tiles, oval tiles, square tiles, hexagonal tiles, and rectangular tiles.

14. The polishing pad of claim 1, wherein each of the plurality of discrete protrusions has, in a global plane of the polishing side of the homogeneous body, a shortest dimension approximately in the range of 5-50 millimeters.

15. The polishing pad of claim 1, further comprising:
    a detection region disposed in the back side of the homogeneous body.

16. The polishing pad of claim 1, further comprising:
    a local area transparency (LAT) region disposed in the homogeneous body.

* * * * *